US006665478B1

(12) United States Patent
Shen

(10) Patent No.: US 6,665,478 B1
(45) Date of Patent: Dec. 16, 2003

(54) FIBER OPTIC CABLE WITH NON-CORRUGATED ARMOR SHIELDING

(75) Inventor: Steven X. Shen, Hickory, NC (US)

(73) Assignee: Alcatel, Paris (FR)

( * ) Notice: Subject to any disclaimer, the term of this patent is extended or adjusted under 35 U.S.C. 154(b) by 74 days.

(21) Appl. No.: 09/689,886

(22) Filed: Oct. 13, 2000

(51) Int. Cl.[7] .............................................. G02B 6/44
(52) U.S. Cl. ...................................................... 385/107
(58) Field of Search .............................. 385/107, 108, 385/109, 113

(56) References Cited

U.S. PATENT DOCUMENTS

| | | | |
|---|---|---|---|
| 4,054,365 A | | 10/1977 | Marx et al. |
| 4,372,792 A | | 2/1983 | Dey et al. |
| 4,439,633 A | | 3/1984 | Grooten |
| 4,521,072 A | | 6/1985 | Cholley et al. |
| 4,568,144 A | | 2/1986 | Occhini et al. |
| 4,679,898 A | | 7/1987 | Grooten |
| 4,729,629 A | | 3/1988 | Saito et al. |
| 5,039,197 A | * | 8/1991 | Rawlyk ...................... 385/102 |
| 5,050,957 A | | 9/1991 | Hamilton et al. |
| 5,053,582 A | | 10/1991 | Terakawa et al. |
| 5,212,755 A | * | 5/1993 | Holmberg .................. 385/107 |
| 5,422,973 A | * | 6/1995 | Ferguson et al. ........... 385/112 |
| 5,509,097 A | * | 4/1996 | Tondi-Resta et al. ....... 385/109 |
| 5,636,305 A | * | 6/1997 | Warner et al. .............. 385/100 |
| 5,778,652 A | | 7/1998 | Kunze |
| 5,920,672 A | * | 7/1999 | White ........................ 385/110 |
| 6,014,487 A | * | 1/2000 | Field et al. ................. 385/110 |
| 6,049,647 A | * | 4/2000 | Register et al. ............. 385/101 |
| 6,304,701 B1 | * | 10/2001 | Bringuiter et al. ......... 385/106 |
| 6,317,540 B1 | * | 11/2001 | Foulger et al. ............. 385/100 |
| 6,349,161 B1 | * | 2/2002 | Gleason et al. ............ 385/113 |
| 6,377,738 B1 | * | 4/2002 | Anderson et al. .......... 385/100 |

FOREIGN PATENT DOCUMENTS

| | | |
|---|---|---|
| DE | 37 16871 A1 | 12/1988 |
| DE | 197 13 306 C1 | 4/1998 |
| EP | 0 545-622 A1 | 6/1993 |
| GB | 2 164 469 | 3/1986 |
| GB | 2 295 028 A | 5/1996 |
| RU | 2007654 C1 | 2/1994 |
| WO | WO 98/06109 | 2/1998 |

OTHER PUBLICATIONS

Armouring Telecommunications Cable With Coated Steel Tabe by William Busch, Granville Research & Development Center No date.
Development and Actual Environment Testing of Optical Fiber Cables With Small Diameter Stainless Pipe by Yasushi Sudo, et al. "International Wire & Cable Symposium Proceedings 1997".

* cited by examiner

*Primary Examiner*—Lynn Feild
*Assistant Examiner*—Thanh-Tam Le
(74) *Attorney, Agent, or Firm*—Sughrue Mion, PLLC

(57) ABSTRACT

A fiber optic cable is fabricated with a non-corrugated armor tube which reduces the amount of material needed for the armoring while maintaining adequate cable flexibility. The outer diameter (OD) of the armor tube has a relationship with the thickness (t) of an outer jacket and intervening layers disposed about the tube such that $2t \leq OD \leq 10t$. If the tube is formed from a metal tape, sufficiently flexibility is provided as long as the outer diameter is less than 10t. The tube and outer jacket are loosely adhered to maintain flexibility, and the bending strain is maintained at less than 87.5% of the maximum bending strain for the cable.

24 Claims, 2 Drawing Sheets

Controlling dimensions in a generic cable construction

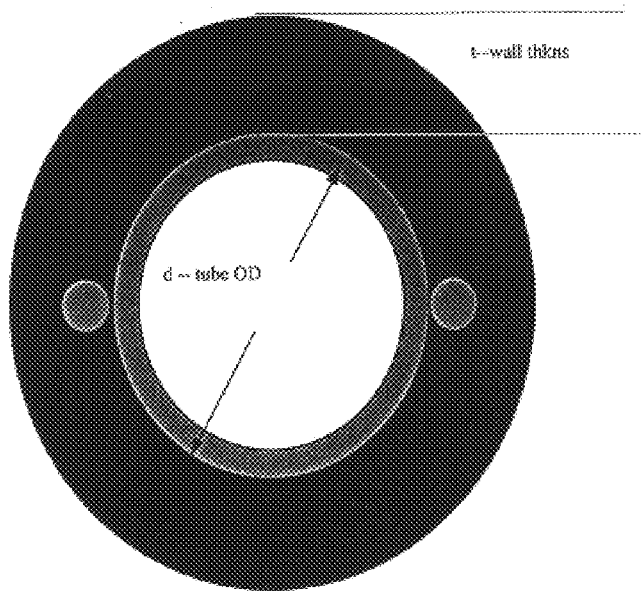
Figure 1a). Cable construction shows controlling dimensions
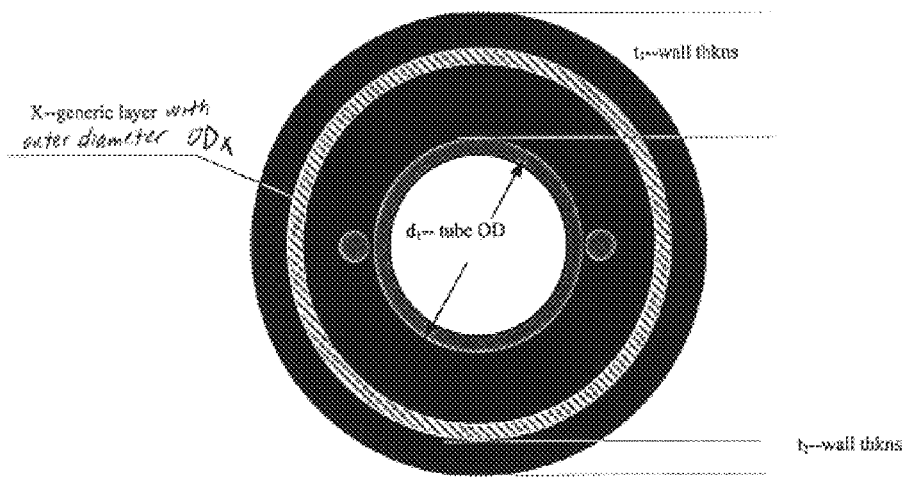
Figure 1b). Controlling dimensions in a generic cable construction

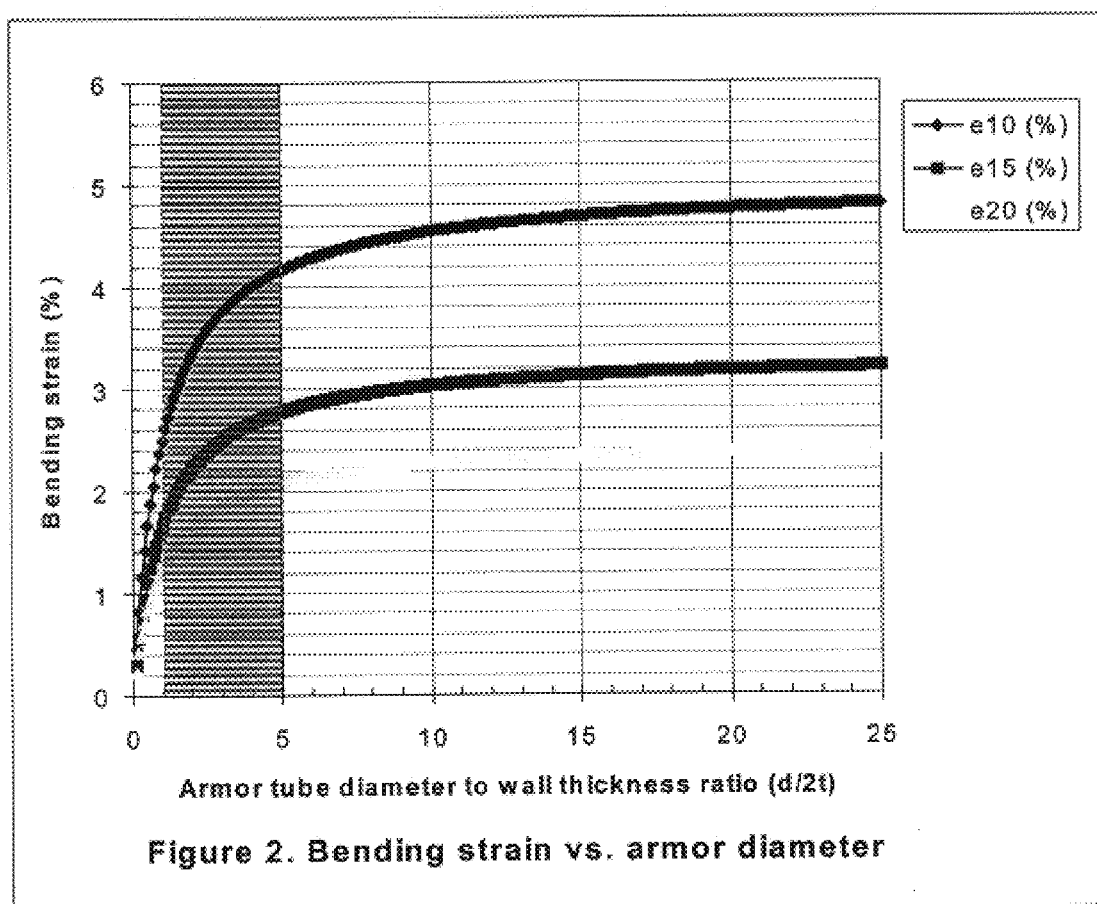
Figure 2. Bending strain vs. armor diameter

FIBER OPTIC CABLE WITH NON-CORRUGATED ARMOR SHIELDING

FIELD OF INVENTION

The invention relates to a small diameter fiber optic cable including an uncorrugated armor shielding that maintains flexibility and mechanical strength in the cable.

DESCRIPTION OF THE RELATED ART

A first type of conventional cable includes a protective armor shielding disposed about one or more signal-carrying optical fibers in order to protect the fibers while maintaining adequate flexibility in the cable. The armor shielding typically comprises a corrugated metal. However, the use of a corrugated material increases the amount of material necessary to protect a given length of optical fibers and further increases the cable diameter and weight. The corrugated material also requires an additional processing step, thereby increasing the manufacturing time, and further increasing the probability that the metal armoring can be damaged during the corrugation process.

As a second conventional device, optical fibers are armored with a welded steel tube. However, the process for producing the welded tube is very complicated and slow, thereby increasing manufacturing costs. Welded steel tubes have performance advantages, such as better structural integrity. However, welded steel tubes also have attendant disadvantages such as decreased flexibility.

As a third conventional device, a flat (uncorrugated) steel tape becomes bonded to a cable jacket. However, the bonding in such conventional cables does not provide sufficient flexibility to pass industry-based flexing tests. In particular, because the bonding between the jacket and armoring tape cannot be made uniform, local stresses accumulate at areas where bonding forces are weak. Thus, such bonded flat metal tapes introduce an unacceptably high level of localized bending stress in the cable armor.

SUMMARY OF THE INVENTION

Applicant's invention overcomes the above deficiencies. The inventor of the present inventive cable observed that non-corrugated armor tapes could meet necessary industry standards by maintaining the ratio of the armor tube diameter and the thickness of the jacket tube wall for a specified cable diameter within a prescribed range. This ratio permits flexing that comports with industry standards while maintaining adequate cable resistance in compression and tensile tests.

DESCRIPTION OF THE DRAWINGS

Preferred embodiments of the invention will be discussed below with reference to the following drawings where:

FIGS. 1(a)–(b) illustrate cross sections of armored cables for explaining the structure of preferred embodiments of the invention; and FIG. 2 illustrates bending strain as a function of the ratio of tube diameter to wall thickness for explaining preferred embodiments of the invention.

DESCRIPTION OF THE PREFERRED EMBODIMENT

Referring to FIG. 1(a), a cable of the present invention includes an armor tape formed into a cylindrical form with outer dimension OD. The tape may or may not include an overlapped portion where the two ends of the steel tape meet. Some degree of tape overlap aids in flexing of the armoring structure. However, the cylindrical armor form may also be formed as a seamless cylindrical tube. One or more optical fibers (not shown) are disposed within the armor cylinder. The armoring material comprises a metal, and preferably one of many commercially produced steel tapes, which are readily available and easy to transform into an armoring layer. Commercial tapes available from various vendors have a thickness of approximately 0.1 to 0.15 mm. A typical modulus of elasticity for steel is 30,000,000 lbs/in$^2$ as compared to 10,000,000 lbs/in$^2$ for aluminum and 15,000,000–17,000,000 lbs/in$^2$ for copper. An outer wall comprising a cable jacket has a thickness t. The cable may also be provided with one or more radial strength members RSM or intervening layers X (See FIG. 1(b)) external to the armor shielding.

In FIG. 1(b), the thickness $t_1$ includes the thicknesses of the jacket itself and any intervening layers X. The intervening layer X may comprise one or more buffer tubes, additional armor-jacket pairs, woven tapes, stranded yams, or other strength members. These layers may be provided in any combination. The sum of the armor tube outer dimension OD and the thickness of the walls of the outer layers ($2t_1$) will be typically specified by a system designer as a cable diameter CD. It has been determined that for a particular CD, there can be a variation in the ratio between OD and the wall thickness $t_1$ such that a non-corrugated metal armor can provide adequate bending, e.g. cable flexibility, and still provide adequate protection to satisfy commonly applied standards for cabling.

In a preferred embodiment, when a seamless tube is used the armor tube diameter will be in the range between 2 to 10 times the wall or a total build-up thickness ($t_1$) over the armor ($2t_1 \leq d_{tube} \leq 10t_1$). The lower limit prescribes a practical application limit for general purpose use while the upper limit describes a particular bending strain characteristic. This range of thicknesses for the armor tube diameter provides a bending strain, which is a measure of resistance to bending, that is less than 87.5% of the value when the bending strain reaches an asymptotic maximum. When the steel tape is formed into a cylindrical shape for armoring purposes, sufficient flexing can be maintained provided that OD≦10t.

FIG. 2 illustrates the relationship of bending strain and the armor cylinder dimensions as deemed relevant by the inventor. The graph is plotted for an arbitrary cable diameter (CD) to be specified by a system design. A typical cable diameter falls within a range of a quarter inch to over one inch. The three curves of FIG. 2 correspond to three different curvatures through which the cable is tested. Curves for bends of 10×CD; 15×CD and 20×CD are shown. As illustrated in FIG. 2, when the ratio of the tube diameter to twice the wall thickness is approximately 20 (e.g. where $d_{tube}$ is approximately 40t), the bending strain is not significantly increased even as the armor tube to wall thickness ratio increases. This essentially defines an asymptotic maximum for the particular bending strain curve. In the region that is less than 87.5% of this maximum, the cable is sufficiently flexible to pass standard industry requirements. The area indicated by the horizontal gray bars illustrates an area corresponding to practical useful values for OD in general purpose applications. Special purpose applications are possible where the ratio of $d_{tube}$: 2t would be lower than the area indicated by the gray bars. When these dimensional criteria are met, a non-corrugated armor shielding sustains sufficient being of the optical fiber cable.

It is further observed that when a second armor layer is provided as an intervening layer X in FIG. 1(b), the above described relationship for $d_{tube}$ and $t_1$ should also be applied to the outer diameter $OD_x$, and the outer jacket thickness $t_2$. More particularly, the diameter of the second armor tube $OD_x$ should meet the following inequality $OD_x \leq 10t_2$ when X comprises a steel tape formed into a cylindrical tube. If this condition is not met, then the armoring layer X should be corrugated in order for the cable to sustain sufficient bending. If the inequality $OD_x \leq 10t_2$ is met, then no corrugation of the steel tape is required. Similarly, when the layer X comprises a second armoring layer made from a steel tube, then meeting the condition $2t_2 \leq OD_x \leq 10t_2$ eliminates the need for corrugating the armor tube X. If the condition is not met, then corrugation will be required to sustain adequate flexing.

As an additional feature of the invention, applicant observed that a tight bonding between the uncorrugated armor shielding and the cable jacket causes damage in the cable armor tape during flexing. Commercial metal tapes for application in telecommunications cables typically include an ethylene copolymer coating which helps the outer cable jacket, which is generally formed from a polyethylene, to bond with the metal. However, tight coupling between an uncorrugated metal tape and the cable jacket introduces stress concentration during cable flexing to the tape that may render the cable inappropriate for standard commercial or industrial use. Applicant determined that the adhesion or bonding strength can be controlled by providing a copolymer coating on the armor tape; flooding EAA or a similar coating over the armor tape during processing; or by applying talc or a similar material to reduce adhesion and to control the bonding. To pass the longitudinal test according to REA PE-90, a bonding force in the range of 10–470 N/m is desired; and to pass the circumferential test according to REA PE-39; PE 84; PE 89, a bonding force in the range of 10–1750 N/m is desired. These bonding forces are significantly reduced from the forces on the order of thousands of N/m typically used for armor-jacket bonding. A preferred embodiment of the invention has also passed other industry standards for low and high temperature bend, cyclic flex, tensile and bend, as described in GR20 requirement and TIA/EIA FOTP testing procedures.

While preferred embodiments of the invention have been described above, one skilled in the art would understand that modifications can be made thereto without departing from the spirit and the scope of the present invention.

What is claimed is:

1. A fiber optic cable comprising:
    an uncorrugated armor tape formed into a cylindrical shape to provide an uncorrugated armoring layer;
    an outer layering disposed about a circumference of the uncorrugated armoring layer,
    wherein the armoring layer has an outer diameter OD and the outer layering has a thickness t, and wherein $OD \leq 10t$.

2. The fiber optic cable according to claim 1, wherein a first longitudinal edge of the armor tape overlaps once with a second longitudinal edge of the armor tape in the formation of said cylindrical shape.

3. The fiber optic cable according to claim 1, wherein the armor tape has a modulus of 20,000,000 lbs/in$^2$ or higher.

4. The fiber optic cable according to claim 2, wherein the armor tape has a modulus of 20,000,000 lbs/in$^2$ or higher.

5. The fiber optic cable according to claim 1, wherein said outer layering comprises at least one of a cable jacket, a buffer tube, a second armoring layer, stranded yarns and woven tape.

6. The fiber optic cable according to claim 5, wherein the armor tape has a modulus of 20,000,000 lbs/in$^2$ or higher.

7. The fiber optic cable of claim 1, wherein the armor tape and outer layering are loosely adhered together and are separable with a force F, where $10\ N/m \leq F \leq 470\ N/m$ in longitudinal bonding tests.

8. The fiber optic cable of claim 1, wherein the armor tape and outer layering are loosely adhered together and are separable with a force F, where $10\ N/m \leq F \leq 1750\ N/m$ in circumferential bonding tests.

9. A fiber optic cable comprising:
    an armor cylinder having an outer diameter OD; and
    an outer layering having a thickness t disposed about a circumference of the armor cylinder,
    wherein a ratio of $OD/2t > 20$ describes a condition of a maximum bending strain for the fiber optic cable and wherein OD and t are selected such that $OD/2t$ is less than 87.5% of the maximum bending strain for the fiber optic cable.

10. The fiber optic cable of claim 9, wherein the armor cylinder comprises an uncorrugated metal pipe.

11. The fiber optic cable of claim 9, wherein the armor cylinder comprises uncorrugated metal tape formed into a cylindrical form.

12. The fiber optic cable of claim 11, wherein a first longitudinal edge of the metal tape overlaps once with a second longitudinal edge of the metal tape in the formation of the armor cylinder.

13. The fiber optic cable of claim 11, wherein the metal tape has a modulus of 20,000,000 lbs/in$^2$ or higher.

14. The fiber optic cable of claim 12, wherein the metal tape has a modulus of 20,000,000 lbs/in$^2$ or higher.

15. The fiber optic cable of claim 9, wherein said outer layering comprises at least one of a cable jacket, a buffer tube, an outer armoring layer, stranded yarn and woven tape.

16. The fiber optic cable of claim 9, wherein $OD \geq 2t$.

17. The fiber optic cable of claim 16 wherein $2t \leq OD \leq 10t$.

18. The fiber optic cable of claim 9, wherein the armor cylinder and outer layering are loosely adhered together and are separable with a force F, where $10\ N/m \leq F \leq 470\ N/m$ in longitudinal bonding tests.

19. The fiber optic cable of claim 9, wherein the armor cylinder and the outer layering are loosely adhered together and are separable with a force F, where $10\ N/m \leq F \leq 1750\ N/m$ in circumferential bonding tests.

20. A fiber optic cable, comprising:
    an uncorrugated armor layer; and
    an outer layer disposed about a circumference of the uncorrugated armor layer,
    wherein the armor layer has an outer diameter OD and the outer layer has a thickness t, and wherein $OD \leq 10t$.

21. A fiber optic cable comprising:
    an armor tape formed into a cylindrical shape to provide an armoring layer;
    an outer layering disposed about a circumference of the armoring layer,
    wherein the armoring layer has an outer diameter OD and the outer layering has a thickness t, and wherein $OD \leq 10t$.

22. The fiber optic cable of claim 21, wherein said armor tape is uncorrugated.

23. A fiber optic cable comprising:
    an armor tape formed into a cylindrical shape to provide an armoring layer;

an outer layering disposed about a circumference of the armoring layer, wherein the armoring layer has an outer diameter OD and the outer layering has a thickness t, and wherein $2t \leq OD \leq 10t$.

24. The fiber optic cable of claim 23, wherein said armor tape is uncorrugated.

* * * * *